(12) United States Patent
Hara et al.

(10) Patent No.: US 7,102,843 B2
(45) Date of Patent: Sep. 5, 2006

(54) MAGNETIC DISK APPARATUS AND METHOD FOR MONITORING HIGH-FREQUENCY OSCILLATION COMPONENTS

(75) Inventors: Takeshi Hara, Kawasaki (JP); Mitsuo Kamimura, Kawasaki (JP); Yukio Abe, Kawasaki (JP); Yoshinari Higashino, Kawasaki (JP); Kunihiro Shimada, Kawasaki (JP); Kiyoshi Sakuma, Kawasaki (JP); Atsushi Suzuki, Kawasaki (JP); Kentaroh Katoh, Chiba (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 10/694,535

(22) Filed: Oct. 27, 2003

(65) Prior Publication Data

US 2004/0125494 A1   Jul. 1, 2004

Related U.S. Application Data

(63) Continuation of application No. PCT/JP01/03704, filed on Apr. 27, 2001.

(51) Int. Cl.
*G11B 21/02* (2006.01)
(52) U.S. Cl. ..................... 360/75; 360/77.04
(58) Field of Classification Search ............. None
See application file for complete search history.

(56) References Cited

U.S. PATENT DOCUMENTS

| | | | |
|---|---|---|---|
| 5,457,587 A * | 10/1995 | Suzuki | 360/77.04 |
| 5,548,452 A * | 8/1996 | Bonaccio | 360/46 |
| 5,822,144 A * | 10/1998 | Takahashi | 360/67 |
| 5,870,242 A | 2/1999 | Abe et al. | |
| 5,978,167 A * | 11/1999 | Abe | 360/77.04 |
| 6,118,603 A * | 9/2000 | Wilson et al. | 360/48 |
| 6,473,254 B1 * | 10/2002 | Hamaguchi et al. | 360/48 |

FOREIGN PATENT DOCUMENTS

| | | |
|---|---|---|
| EP | 0785542 A1 * | 7/1997 |
| EP | 0 969 465 | 1/2000 |
| JP | 03-016068 | 1/1991 |
| JP | 8-195044 | 7/1996 |
| JP | 9-180355 | 7/1997 |
| JP | 11-007738 | 1/1999 |
| JP | 11-203808 | 7/1999 |
| WO | WO 02/091381 | 11/2002 |

* cited by examiner

*Primary Examiner*—Kin Wong
(74) *Attorney, Agent, or Firm*—Greer, Burns & Crain, Ltd.

(57) ABSTRACT

A magnetic disk apparatus includes a magnetic disk with normal and double servo sectors arranged alternately. If a servo interruption period corresponding to adjacent first servo sectors is a first servo interruption period, then a second servo interruption period that is a servo interruption period corresponding to adjacent first servo sector and second servo sector is equal to or less than half of the first servo interruption period.

5 Claims, 16 Drawing Sheets

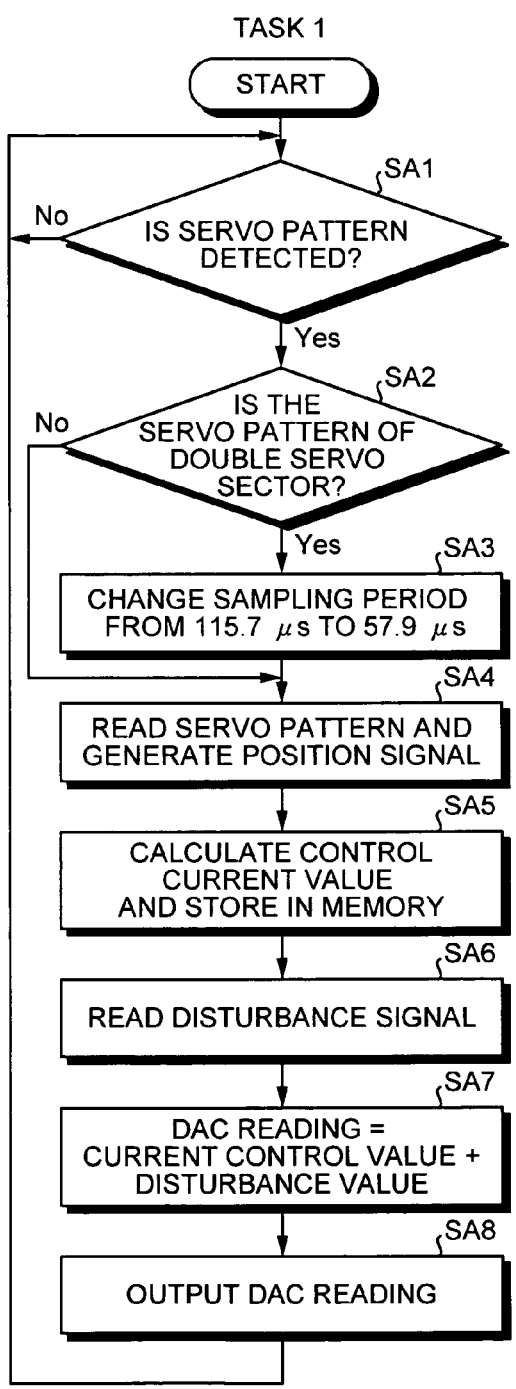
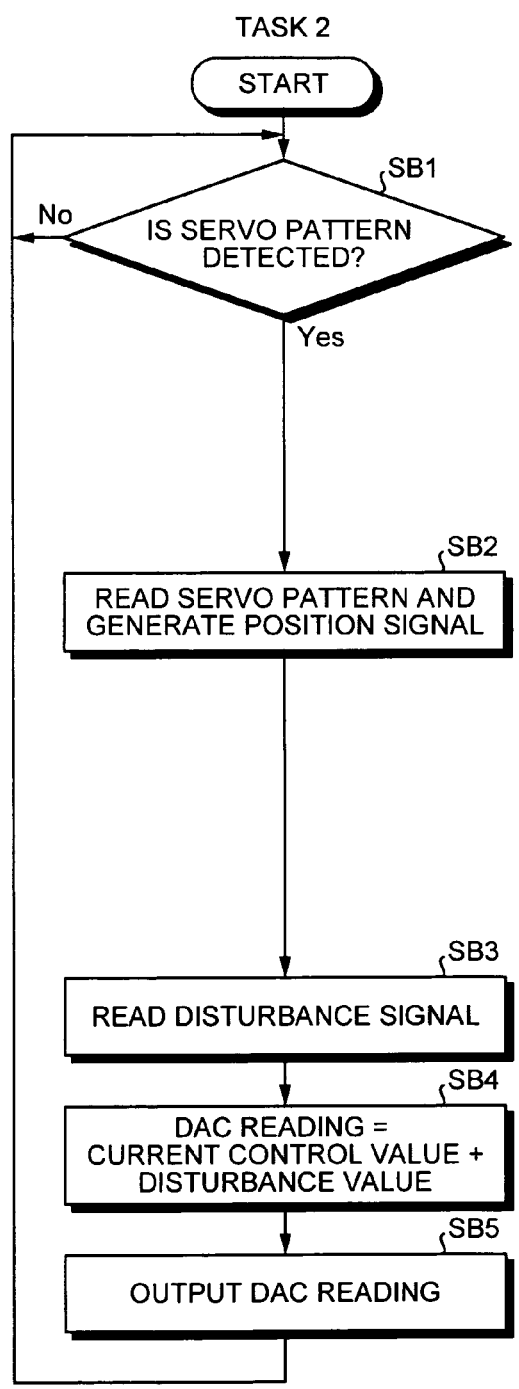

$$f1(n) = \sum_{n=0}^{31} |P(n)-P(n-1)| \quad \cdots \cdots (1)$$

$$f2(n) = \sum_{n=0}^{31} |P(n)-2P(n-1)+P(n-2)| \quad \cdots \cdots (2)$$

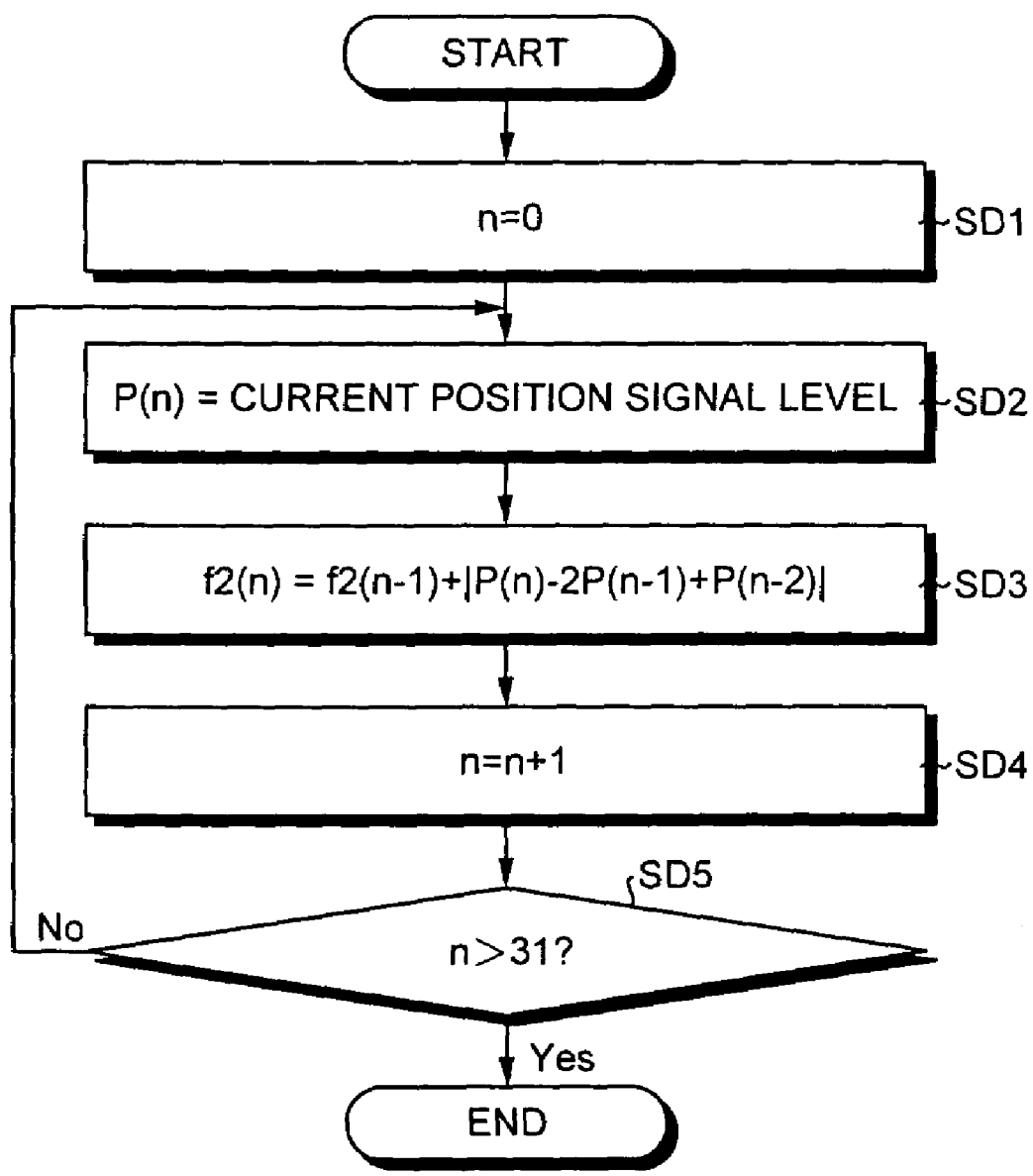

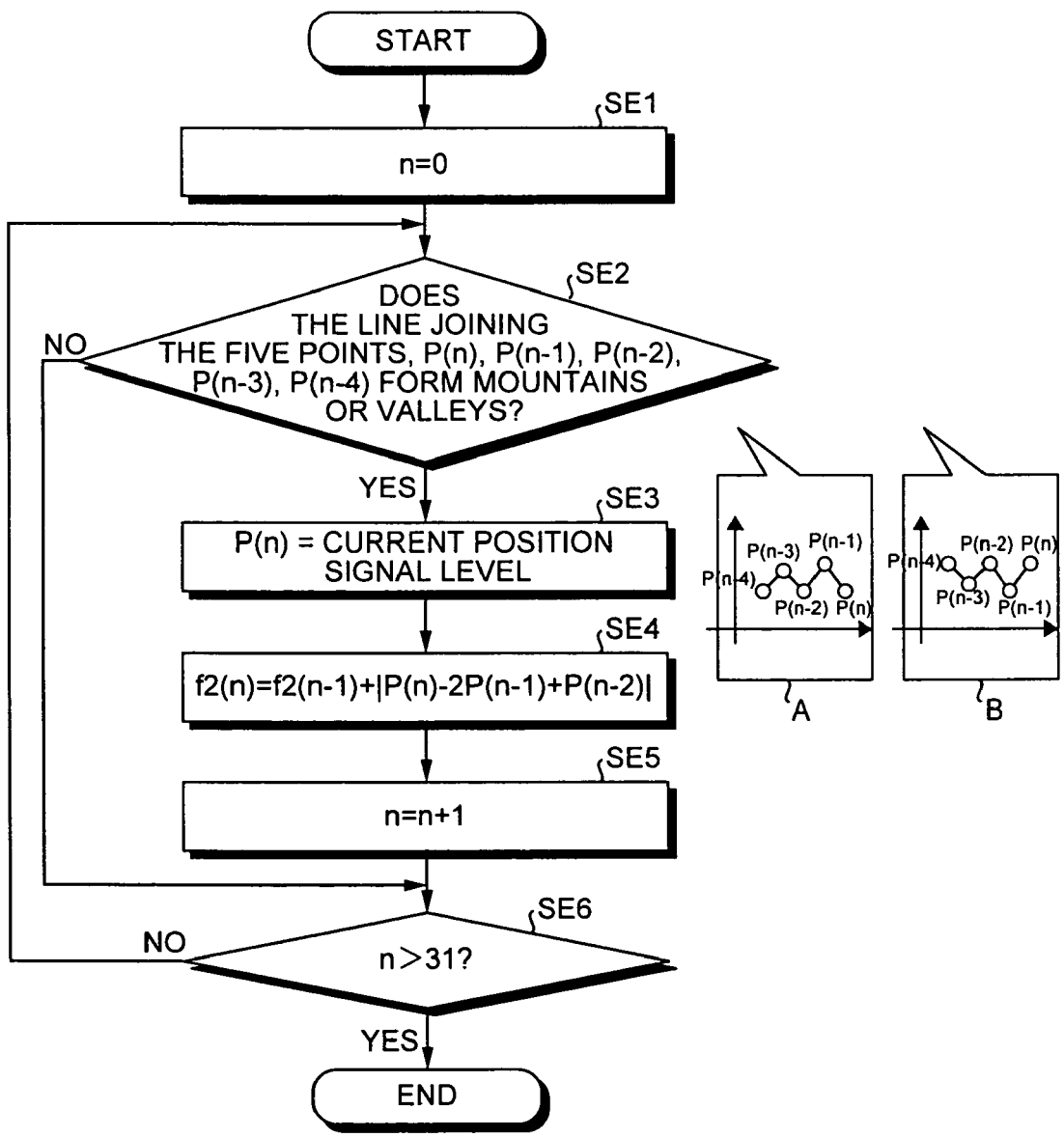

FIG.11A
| METHOD 1 | METHOD 2 | METHOD 3 | MAX METHOD 1 | MAX METHOD 2 | MAX METHOD 3 |
|---|---|---|---|---|---|
| 9752 | 9607 | 4046 | 0.20837 | 0.17588 | 0.17588 |
FIG.11B
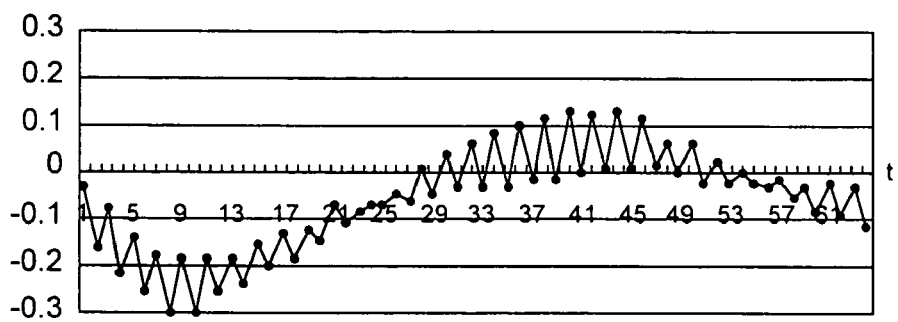
POSITION SIGNAL LEVEL
FIG.12A
| METHOD 1 | METHOD 2 | METHOD 3 | MAX METHOD 1 | MAX METHOD 2 | MAX METHOD 3 |
|---|---|---|---|---|---|
| 1429 | 1392 | 1638 | 0.03845 | 0.03368 | 0.03368 |
FIG.12B
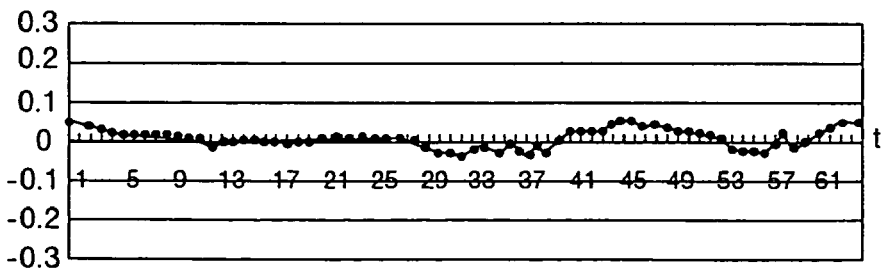
POSITION SIGNAL LEVEL ically regenerated voltage, the servo patterns
MAGNETIC DISK APPARATUS AND METHOD FOR MONITORING HIGH-FREQUENCY OSCILLATION COMPONENTS This is a continuation of International PCT Application No. PCT/JP01/03704, filed Apr. 27, 2001.

TECHNICAL FIELD

The present invention relates to a magnetic disk apparatus used as a storage device in computers and a method for monitoring high-frequency oscillation components in the oscillation frequency of the magnetic head.

BACKGROUND ART

Magnetic disk apparatuses include magnetic disks on which data is stored. When reading data from or write data to a magnetic disk, a magnetic head is moved to a specific track, i.e. make the magnetic disk on-track. This operation is know as a seek operation.

If the magnetic disk is faulty, high-frequency oscillation components that have a frequency which is more than half of a servo interruption frequency, are generated in the oscillation frequency of the magnetic head. In the on-track status, these components cannot be monitored. A means to effectively solve this problem has been sought in the past.

FIG. 18 is a perspective view of a conventional magnetic disk apparatus 10. The magnetic disk apparatus 10 includes a chassis 11 and a cover 12. The chassis 11 and the cover 12 form an air-tight container within which are included a hard disk assembly 14, a print circuit board 22, and a connector 23. All circuits are mounted on the print circuit board 22. The connector 23 electrically connects the parts of the hard disk assembly 14 and the print circuit board 22.

The chassis 11 accommodates a plurality of magnetic disks $15_1$ through $15_n$, a spindle motor 16, magnetic heads $17_1$, through $17_n$, a carriage 18, a flexible print circuit sheet 19, a head integrated circuit (IC) 20, and a gasket 13. One magnetic head is provided for each magnetic disk at the tip of an arm 21. The cover 11 is closed air-tightly to the chassis 11 because of the gasket 13.

The magnetic disks are stacked above one another at a fixed interval. The spindle motor 16 drives the magnetic disks at a high speed. The carriage 18 supports the magnetic heads through the arm 21.

FIG. 19 is a block diagram of servo circuit parts of the conventional magnetic disk apparatus 10. The parts in FIG. 19 that are identical to those in FIG. 18 are assigned identical reference numerals. The magnetic disk $15_1$ is partitioned into, for example, ten servo sectors $SP_1$ through $SP_{10}$. One data sector is provided between two servo sectors. Thus, there are ten data sectors $D_1$ through $D_{10}$.

Servo patterns that recognize the position of the magnetic head $17_1$ are stored in the servo sectors. On the other hand, data are stored in the data sectors. A plurality of concentric cylinders exist in the magnetic disk $15_1$ through 15n.

The magnetic head $17_1$, which is located close to the top of the magnetic disk $15_1$, includes a head core and a coil that is wound around the head core.

When writing, an electric current is passed through the coil of the magnetic head $17_1$. A magnetic field is generated because of the and the data is written on the data sectors. On the other hand, when reading, the magnetic head $17_1$ detects, as magnetically regenerated voltage, the servo patterns stored in the servo sectors and the data stored in the data sectors.

The head IC 20 includes a write amplifier (not shown) and a preamplifier (not shown). The write amplifier switches the polarity of the recording current to be supplied to the magnetic head $17_1$ in accordance with the write data. The preamplifier amplifies the regenerated voltage (read signals) detected by the magnetic head $17_1$.

A read channel (RDC) 30 includes a circuit for writing the write data to the magnetic disk $15_1$ and a circuit for reading the read data or the servo pattern from the magnetic disk $15_1$. The read channel 30 further includes a parallel/serial converting circuit that converts parallel write data into serial data, a synthesizer circuit that generates timing signals for each part of the apparatus by stepping up the frequency of an oscillating circuit that, in turn, employs a crystal oscillator.

After the servo pattern input via the read channel 30 is modulated by peak-hold or integration, a digital servo controller 31 controls (servo control), based on the modulated servo pattern, the position of the magnetic head $17_1$, by controlling the driving currents of a voice coil motor (VCM) 32 and the spindle motor 16 (see FIG. 18). The voice coil motor 32 is a driving source of the seek operation which involves radially shifting and positioning the magnetic head $17_1$ on a specific cylinder by driving the cylinder 18 using the driving currents.

When the magnetic disk $15_1$ is being driven and the magnetic head $17_1$ is in the on-track status, data reading/writing and servo pattern reading are repeated in an alternating manner according to the sequence of the servo sectors and the data sectors.

When the reading or writing operation of data is interrupted and the servo pattern is read, it is called a servo interruption. The period for which the servo interruption takes place is called a servo interruption period. The frequency during the servo interruption is called a servo interruption frequency.

FIG. 20 illustrates the servo interruption. The saw-tooth waveform $W_1$ is a waveform of a frequency $f_1$. The points $t_1, t_2, \ldots$, indicated by hollow circles, are points in time when servo interruption occurs in each servo interruption period $T_1$. The vertical axis represents the position of the magnetic head $17_1$. In other words, when the position is zero (0), it indicates that the magnetic head $17_1$ is on the target cylinder (that is, an on-track status). When the position is not zero, it indicates that the magnetic head $17_1$ has shifted from the target cylinder and requires a position correction.

The digital servo controller 31 shown in FIG. 19 demodulates the servo pattern that is read by the magnetic head $17_1$ and input through the read channel 30 in each servo interruption period $T_1$, and recognizes the position of the magnetic head $17_1$. If the magnetic head $17_1$ is found to be shifted, the digital servo controller 31 changes the drive current supplied to the voice coil motor 32 and carries out the servo control in order to make the status of the magnetic head $17_1$ on-track.

The servo pattern stored in each of the servo sectors $SP_1$ through $SP_{10}$ of the magnetic disk $15_1$ is explained next with reference to FIG. 21. A servo pattern 100 comprises a servo preamble 110, a servo mark 120, a gray code 130, and a burst 140. The servo preamble 110 corresponds to a reference signal of a servo gain.

The servo mark 120 produces the servo interruption. The gray code 130 and the burst 140 represent the cylinder of the magnetic disk $15_1$. In other words, the gray code 130 represents the whole number part of the cylinder and the burst 140 represents the fraction part of the cylinder. For example, if the cylinder is represented by 1000.0001, the gray code 130 represents 1000 (whole number) and the burst 140 represents 0.0001 (fraction).

FIG. 22 illustrates the burst 140 and all types of signals. A plurality of patterns of the burst 140 exist between the cylinders cy 1.0000 and cy 1.0004 in the magnetic disk 15$_1$. For instance, when the burst 140 of the cylinder cy 1.0000 is read by the magnetic head 17$_1$, four types of signals having a triangular waveform, namely, signal PosA, signal PosB, signal PosC, and signal PosD, are obtained. The signals PosA and PosB have a reverse phase relation. Similarly, the signals PosC and PosD have a reverse phase relation. The signals PosA and PosC have a phase difference of π/2 between them. Similarly, the signals PosB and PosD have a phase difference of π/2 between them.

When the burst 140 is read by the magnetic head 17$_1$, a position deviation signal A illustrated in FIG. 23 is generated from the signals PosA, PosB, PosC, and PosD in a modulator (not shown). The position deviation signal A represents the offset amount from the center of a track and comprises opposing signals PosN and PosQ.

As shown in FIG. 22, the signal Pos N is obtained by subtracting the signal PosB from the signal PosA. Similarly, the signal PosQ is obtained by subtracting the signal PosD from the signal PosC. The modulator selects the opposing signals PosN and PosQ one after another and generates the position deviation signal A. Conventionally, the modulator carries out a linear correction by multiplying a burst modulation value with a constant correction value so that the burst modulation value coincides with the meeting point of the signals PosN and PosQ, as illustrated in FIG. 23.

When the magnetic head 17$_1$ is positioned on the target track, the servo control takes place in such a way that, depending on the current instruction value corresponding to the position deviation signal A, the magnetic head is positioned at the center of the target track.

If the magnetic head 17$_1$ is in the on-track status, disturbances of various kinds occur, which may cause the magnetic head 17$_1$ to vibrate. These disturbances may be vibration due to rotation of the magnetic disk 15$_1$, air pressure, shake due to the burst, jitter due to the drive current, or resonance of the Kashime junction between the magnetic head 17$_1$ and the arm 21.

When an oscillation waveform is obtained during disturbances, it is observed that high-frequency oscillation components that are included in the position signals obtained from the servo pattern and that have a frequency exceeding half of the servo interruption frequency ($1/T_1$), can pose a problem.

According to Shannon's theorem, if the high-frequency oscillation components that have a frequency which is more than half of the servo interruption frequency (sampling frequency) are included, these high-frequency oscillation components cannot be monitored and thus influence the positioning accuracy of the magnetic head 17$_1$.

For instance, when the servo interruption frequency in FIG. 20 is 8.64 kHz and the resonance frequency (high-frequency oscillation components) at the Kashime junction due to the disturbances is 8.6 kHz, then according to Shannon's theorem, the high-frequency oscillation components cannot be monitored.

It has already been described that a servo control, which conventionally involves a linear correction process in which the burst modulation value is multiplied by a constant correction value, as illustrated in FIG. 23, is carried out.

If the magnetic head 17$_1$ has a non-linear head sensitivity characteristic, a non-linear position deviation signal B illustrated in FIG. 23 would be ideal. However, since the magnetic head 17$_1$ is positioned according to the position deviation signal A, the precision of positioning decreases by the difference between the position deviation signal A and the position deviation signal B.

If the magnetic head 17$_1$ has a non-linear head sensitivity characteristic, there is an another problem that if a zero-cross frequency, to which disturbance of minute amplitude is added, is introduced in the design, an open loop gain does not become 0 dB at the center of the track (=0), as illustrated by a characteristic line D in FIG. 24. The open loop gain varies, being high at the center of the track and low in offset positions.

DISCLOSURE OF THE INVENTION

It is an object of the present invention to solve at least the problems in the conventional technology.

A magnetic disk apparatus according to one aspect of the present invention includes a magnetic disk that has a plurality of first servo sectors and a plurality of second servo sectors arranged alternately, wherein servo patterns containing position signals for controlling a position of a magnetic head on the magnetic disk are stored on the first servo sectors and the second servo sectors, wherein when a servo interruption period corresponding to adjacent first servo sectors is a first servo interruption period, a servo interruption period corresponding to adjacent first servo sector and second servo sector is a second servo interruption period, wherein the second servo interruption period is equal to or less than half of the first servo interruption period; a retrieving unit that retrieves, during each of the second servo interruption periods, signal levels of the position signals at a plurality of sample points; an arithmetic unit that calculates an arithmetic result, by substituting the signal levels at a predetermined number of adjoining sample points in a predefined evaluation expression, shifts to next sampling points, and adds a predetermined number to the sample points; and a monitoring unit that monitors the servo interruption period and high-frequency oscillation components in the servo interruption period based on the arithmetic result, to thereby obtain a monitoring result.

A method to control high-frequency oscillation components according to another aspect of the present invention is applied to a magnetic disk apparatus comprising a magnetic disk that has a plurality of first servo sectors and a plurality of second servo sectors arranged alternately, wherein servo patterns containing position signals for controlling a position of a magnetic head on the magnetic disk are stored on the first servo sectors and the second servo sectors, wherein when a servo interruption period corresponding to adjacent first servo sectors is a first servo interruption period, a servo interruption period corresponding to adjacent first servo sector and second servo sector is a second servo interruption period, wherein the second servo interruption period is equal to or less than half of the first servo interruption period. The method includes, retrieving signal levels of the position signals at a plurality of sample points during each of the second servo interruption periods; calculating an arithmetic result by substituting the signal levels at a predetermined number of adjoining sample points in a predefined evaluation expression, shifting to next sampling points, and adding a predetermined number to the sample points; and monitoring the servo interruption period and high-frequency oscillation components in the servo interruption period based on the arithmetic result, to thereby obtain a monitoring result.

A magnetic disk apparatus according to still another aspect of the present invention includes a magnetic disk having servo patterns on which position signals for controlling a position of a magnetic head on the magnetic disk are written, the magnetic head having a head sensitivity characteristic value. The magnetic disk apparatus further includes a correction calculation unit that calculates a correction value to correct the position signals read from the servo patterns, using the head sensitivity characteristic value; and a servo control unit that carries out a servo control of the magnetic head based on the correction value.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 6A and FIG. 6B are flowcharts that explain the servo process in the first embodiment;

FIG. 9 is a flowchart of a high-frequency oscillation monitoring method 2 employed in the first embodiment;

FIG. 10 is a flowchart of a high-frequency oscillation monitoring method 3 employed in the first embodiment;

FIG. 11A and FIG. 11B are explanatory diagrams of the high-frequency oscillation monitoring methods 1 through 3 employed in the first embodiment;

FIG. 12A and FIG. 12B are explanatory diagrams of the high-frequency oscillation monitoring methods 1 through 3 employed in the first embodiment;

BEST MODE FOR CARRYING OUT THE INVENTION

Exemplary embodiments of the present invention are explained next with reference to the accompanying drawings.

Figure 1:
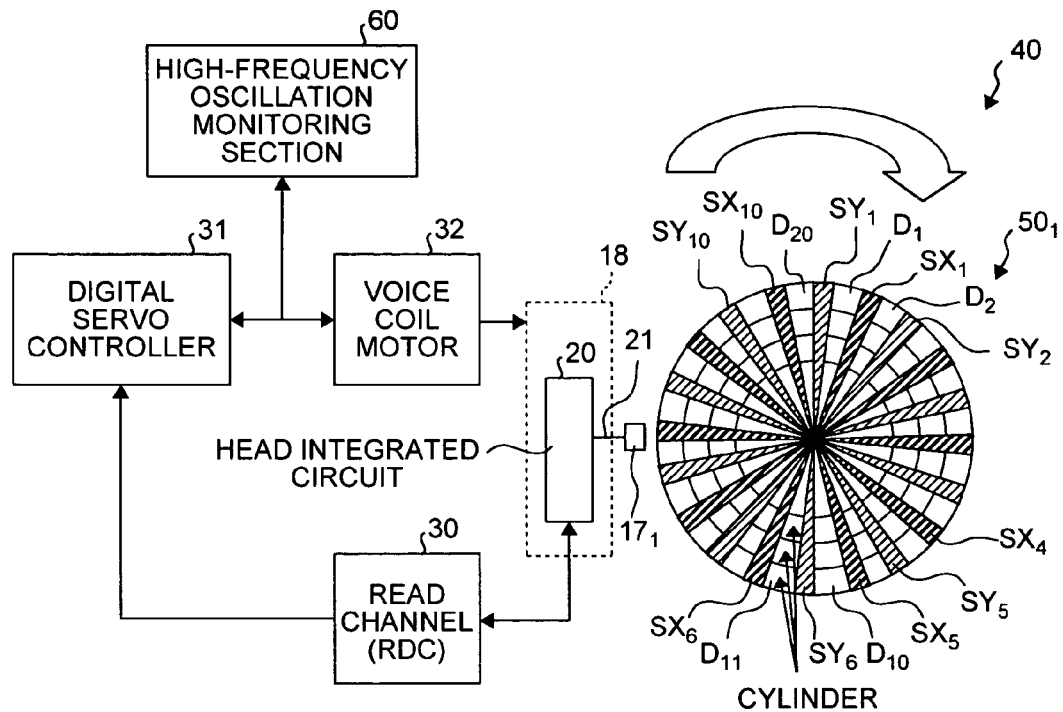
FIG. 1 is a block diagram of a servo circuit of a magnetic disk apparatus 40 according to a first embodiment of the present invention.
Figure 19:
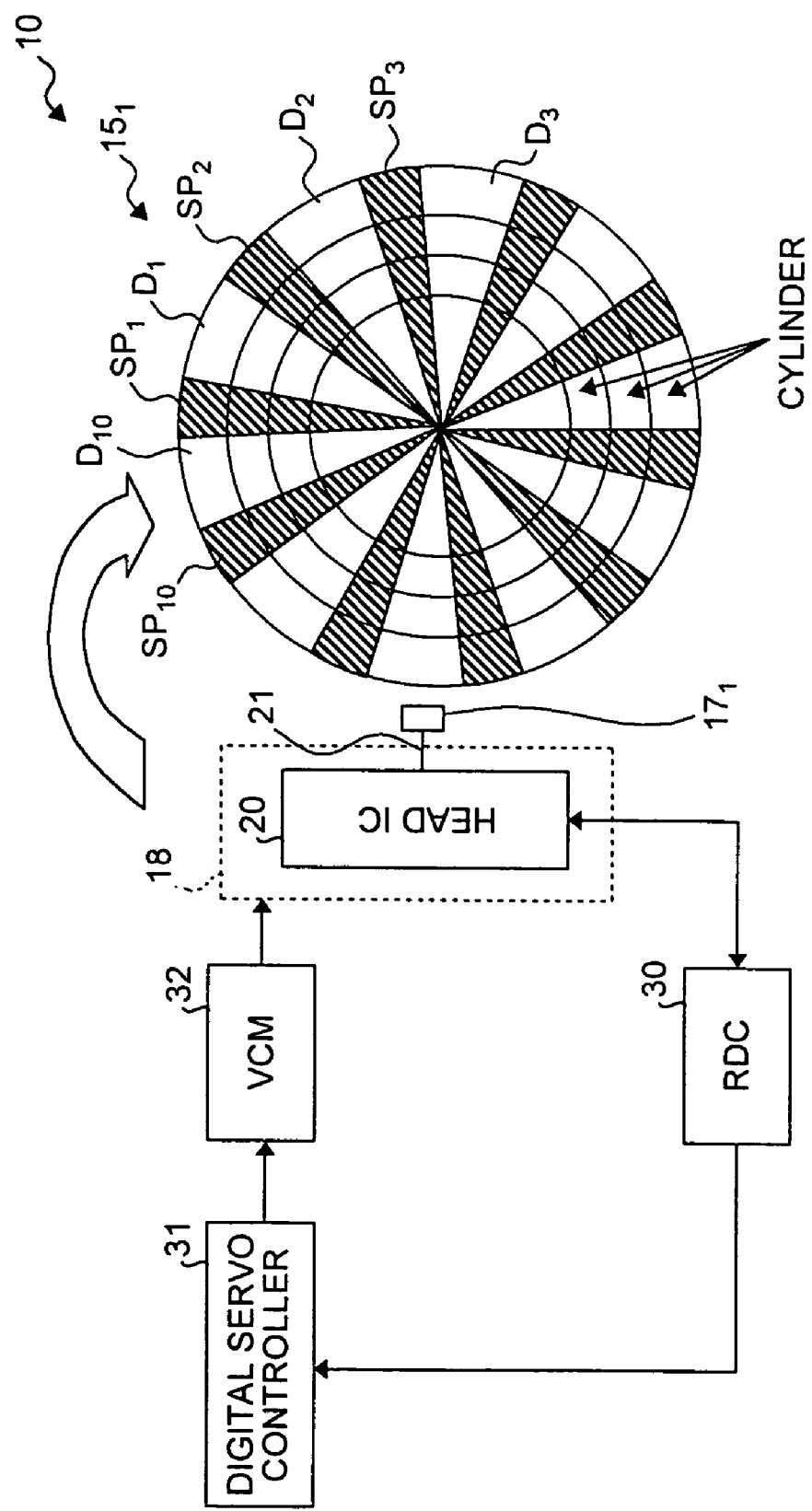
FIG. 19 is a block diagram of the servo circuit parts of the conventional magnetic disk apparatus 10.
Figure 20:
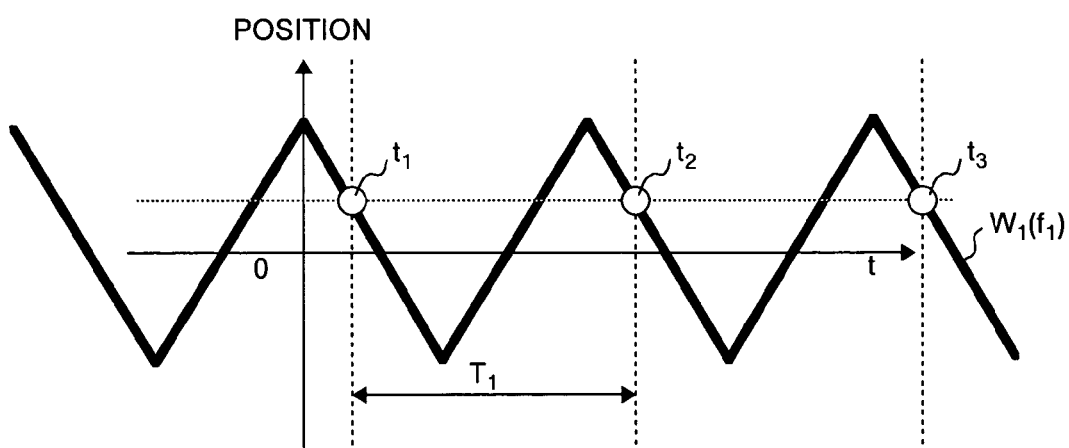
FIG. 20 illustrates a servo interruption that occurs in the magnetic disk 10.

FIG. 1 is a block diagram of a servo circuit of the magnetic disk apparatus 40 according to a first embodiment of the present invention. The parts in FIG. 1 that are identical to those in FIG. 19 are assigned identical reference numerals. The magnetic disk $50_1$ is of a double servo system replaces the magnetic disk $15_1$ of FIG. 19. In addition to the structure shown in FIG. 19, the magnetic disk apparatus 40 includes a high-frequency oscillation monitoring section 60.

The magnetic disk $50_1$ is partitioned into, for example, ten double servo sectors. One normal servo sector and two data sectors are provided between two double servo sectors. In other words, the magnetic disk $50_1$ is partitioned into, for example, 10 double servo sectors $SY_1$ through $SY_{10}$, 10 normal servo sectors $SX_1$ through $SX_{10}$, and 20 data sectors $D_1$ through D20.

Servo patterns that recognize the position of a magnetic head $17_1$ of the magnetic disk $50_1$ are stored in the double servo sectors and the normal servo sectors. On the other hand, data are stored in a radial pattern in the data sectors. The magnetic disk $50_1$ through $50n$ includes plural concentric cylinders.

When writing, the magnetic head $17_1$ writes data to the data sectors. On the other hand, when reading, the magnetic head $17_1$ detects, as magnetically regenerated voltage, the servo patterns stored in the double servo sectors and the normal servo sectors, and the data stored in the data sectors $D_1$ through $D_{20}$.

The high-frequency oscillation monitoring section 60 accurately monitors position signals from the servo patterns even if high-frequency oscillation components that have a frequency which is more than half of the servo interruption frequency (sampling frequency) are included in the position signals.

Figure 2:
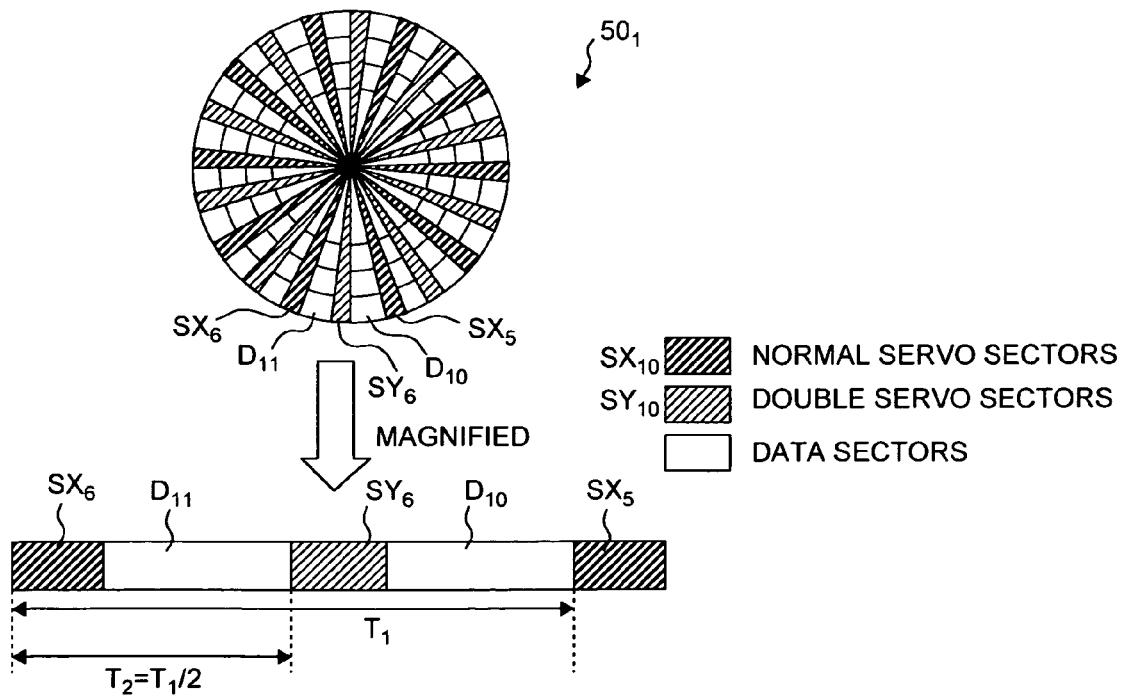
FIG. 2 is a magnified view of a part of the magnetic disk $50_1$ shown in FIG. 1.

A servo interruption period $T_2$ in the magnetic disk $50_1$ is set to half of the conventional servo interruption period $T_1$ (see FIG. 2, FIG. 3A, and FIG. 3D), so that the position signals obtained from the servo patterns can be accurately monitored even if the high-frequency oscillation components that have a frequency which is more than half of the servo interruption frequency (sampling frequency) are included in the position signals.

Figure 4:
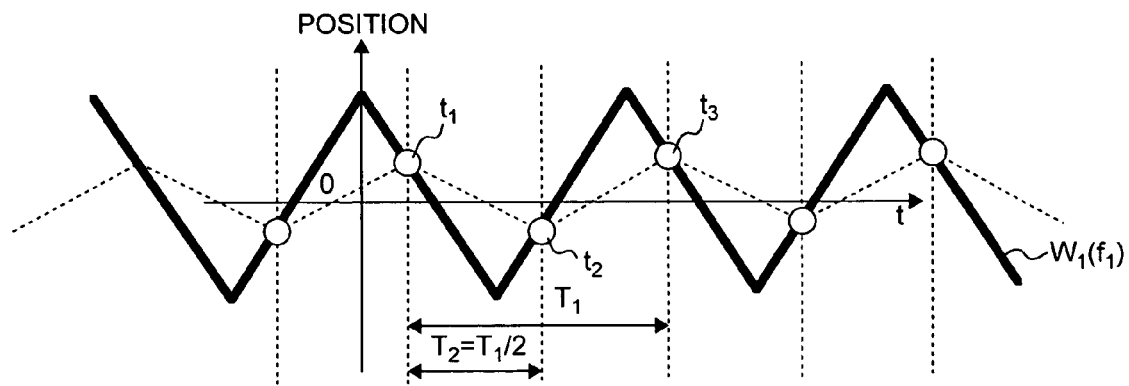
FIG. 4 illustrates a servo interruption period $T_2$ in the first embodiment.

FIG. 4 illustrates the servo interruption period $T_2$ in the first embodiment. The saw-tooth waveform $W_1$ is a waveform of a frequency $f_1$. The points $t_1$, $t_2$, . . . indicated by hollow circles, are points in time when servo interruption occurs in each servo interruption period $T_2$ (which is $T_1/2$).

Figure 5:
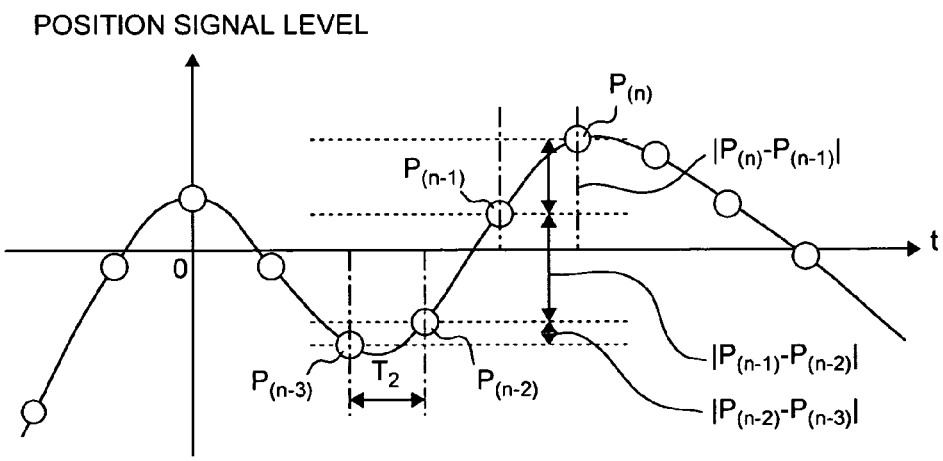
FIG. 5 illustrates a skeletal waveform of a position signal obtained from a servo pattern of the magnetic disk 50, shown in FIG. 1.

FIG. 5 illustrates a skeletal waveform of the position signal obtained from the servo pattern. In the first embodiment, a sampling of position signal levels P(n), P(n−1), P(n−2), . . . takes place in each servo interruption period $T_2$.

When the magnetic disk $50_1$ of FIG. 1 is being driven and the magnetic head $17_1$ is in the on-track status, reading/writing of data and reading of the servo pattern are repeated alternately according to the sequence of the double servo sectors, normal servo sectors, and the data sectors in the magnetic head $17_1$.

Figure 3:
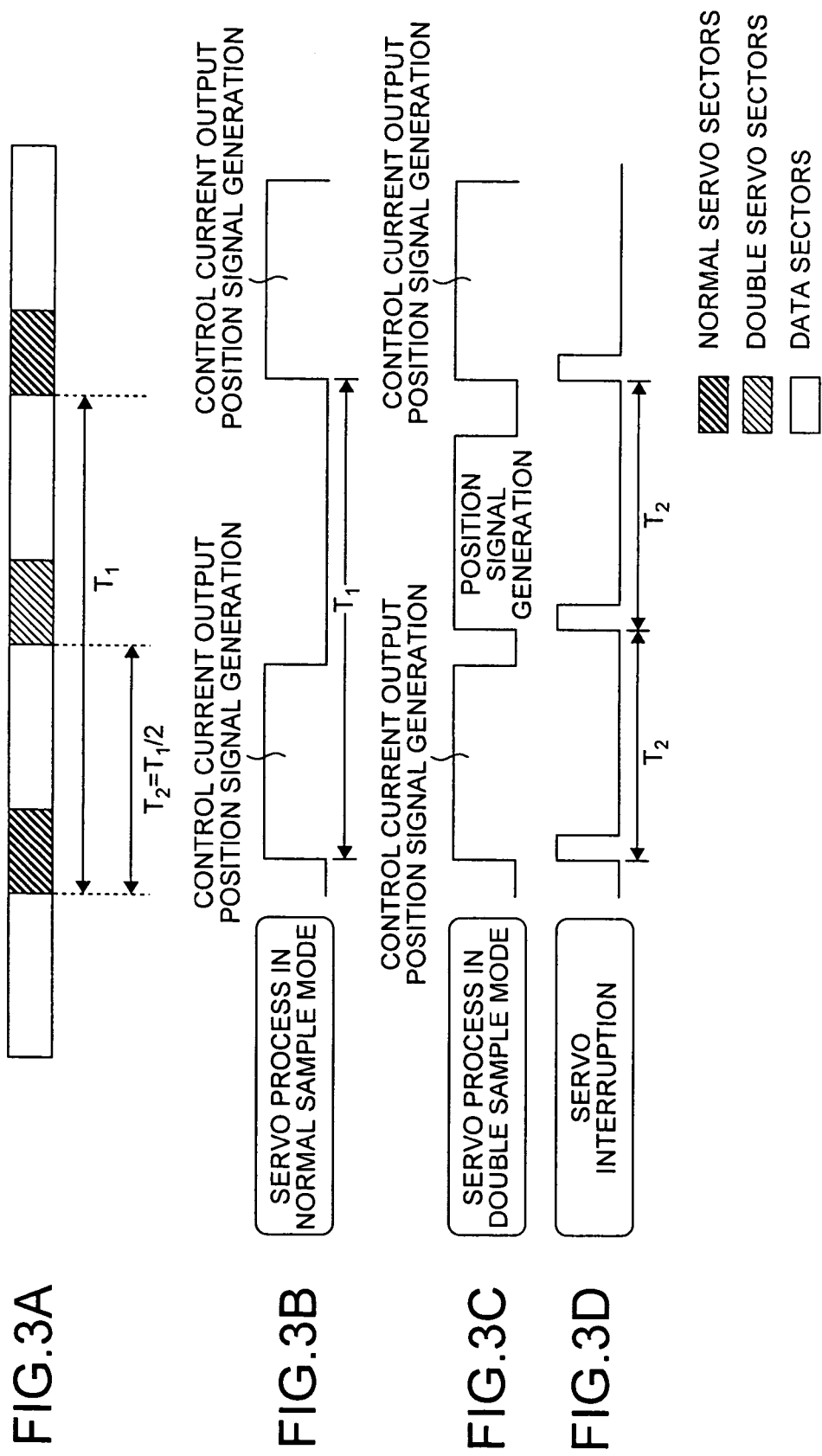
FIG. 3A through FIG. 3D are drawings that explain a servo process in the first embodiment.

A digital servo controller 31 carries out a servo process as illustrated in FIG. 3C (when in a double sample mode) in each servo interruption period $T_2$. The servo process is an alternately repeating process of a control current output and a position signal generation, and the position signal generation. In a conventional system (when in a normal sample mode), the servo process, that is, the control current output and the position signal generation, takes place in each servo interruption period $T_1$, as illustrated in FIG. 3B.

When the magnetic head $17_1$ reads the servo patterns of the normal servo sectors of the magnetic disk $50_1$, the digital servo controller 31 alternately executes the servo process (task 1) shown in FIG. 6A and the servo process (task 2) shown in FIG. 6B in each servo interruption period $T_2$.

In FIG. 6A, in step SA1, the digital servo controller 31 determines whether the servo pattern of the magnetic disk $50_1$ has been detected. If the servo pattern has not been detected ('No' at step SA1), the digital servo controller 31 repeats the same determination process. If the servo pattern of the magnetic disk 50, is detected, step SA2 is executed.

In step SA2, the digital servo controller 31 determines whether the servo pattern is that of the double servo sector. If the servo pattern is not of the double servo sector ('No' at step SA2), step SA4 is executed. If the servo pattern is that of the double servo sector ('Yes' at step SA2), the digital servo controller 31 changes the sampling period from 115.7 microseconds (μs) to 57.9 μs in step SA3.

In step SA4, the digital servo controller 31 reads the servo pattern, and generates a position signal (see FIG. 5) from the servo pattern. In step SA5, the digital servo controller 31 calculates the control current value in order to correct the position shift (servo control) and stores the control current value in a memory (not shown). To be more specific, the digital servo controller 31 calculates the control current value based on the monitoring result corresponding to any of three methods 1 through 3 (explained below) employed by the high-frequency oscillation monitoring section 60 for monitoring the high-frequency oscillation.

Figures 7, 8:
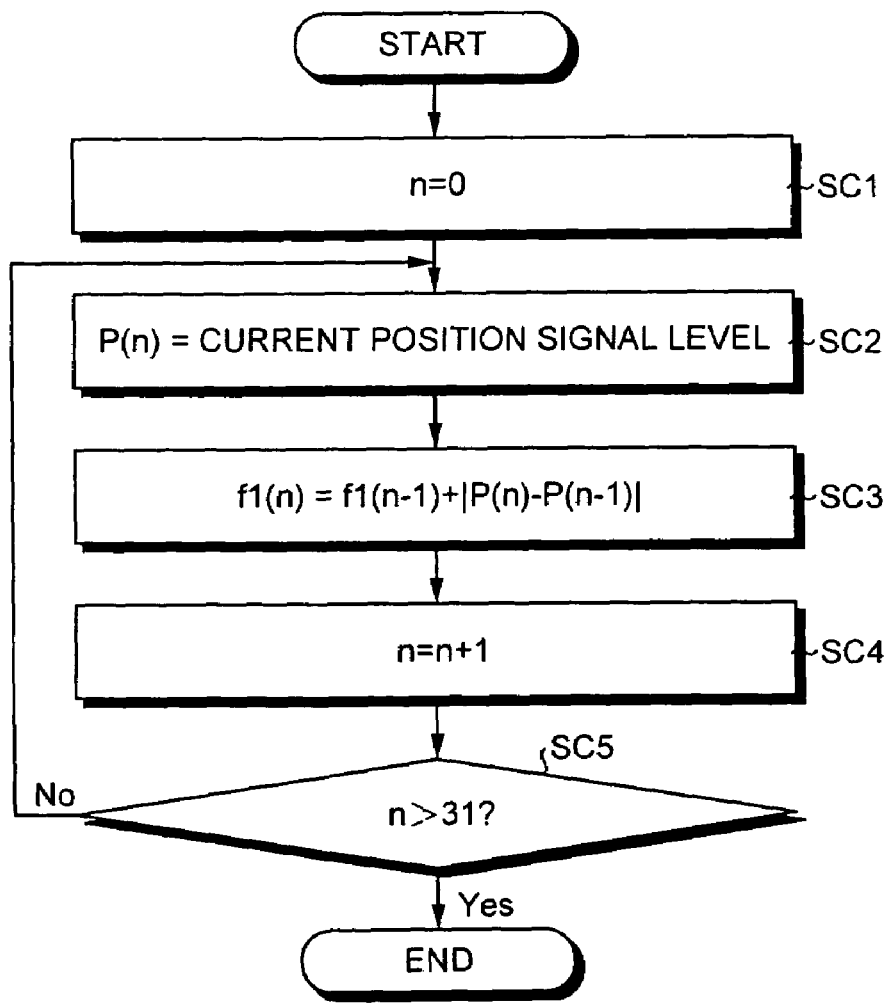
FIG. 7 illustrates expressions (1) and (2) that are used in high-frequency oscillation monitoring methods employed in the first embodiment.
FIG. 8 is a flowchart of the high-frequency oscillation monitoring method 1 employed in the first embodiment.

FIG. 7 illustrates expressions (1) and (2) that are used in high-frequency oscillation monitoring methods employed in the first embodiment. In method 1, after a seek operation of the magnetic head $17_1$ has ended, a serial addition process is performed based on expression (1) of FIG. 7. In this process, a predetermined number (for instance, 32) is added to an absolute value obtained from the difference between the position signal levels of two adjoining sample points. The addition process is carried out after the seek operation has ended because the Kashime resonance frequency has a tendency of damping after the seek operation has ended. In methods 2 and 3 also (described later), the addition process is carried out after the seek operation.

FIG. 8 is a flowchart of the high-frequency oscillation monitoring method 1 employed in the first embodiment. In step SC1, the high-frequency oscillation monitoring section 60 sets the initial value of n to zero. In step SC2, the high-frequency oscillation monitoring section 60 sets the position signal level P(n) of the position signal, shown in FIG. 5, to the current position signal level.

In step SC3, the high-frequency oscillation monitoring section 60 adds the previous addition value f1(n−1) and the next addition value |P(n)−P(n−1)| to calculate the addition value f1(n).

In step SC4, the high-frequency oscillation monitoring section 60 increments n by one. In step SC5, the high-frequency oscillation monitoring section 60 determines whether n has exceeded 31. If n has not exceeded 31 ('No' at step SC5), the high-frequency oscillation monitoring section 60 goes back to step SC2 and repeats the subsequent steps. In this way, the absolute values obtained from the difference between the position signal levels of the two adjoining sampling points (represented by hollow circles in FIG. 5), is serially added.

If the value of n exceeds 31 ('Yes' at step SC5), that is, if the result of expression (1) in FIG. 7 is obtained, the serial addition process is over.

Next, the high-frequency oscillation monitoring section 60 compares the addition value f1(n) obtained by method 1 and a preset threshold value, to determine whether the oscillation amplitude of the magnetic head $17_1$ exceeds a stipulated level. To be more specific, if the addition value f1(n) is greater than the threshold value, the high-frequency oscillation monitoring section 60 recognizes that the oscillation amplitude of the magnetic head $17_1$ is greater than the stipulated level. On the other hand, if the addition value f1(n) is less than the threshold value, the high-frequency oscillation monitoring section 60 recognizes that the oscillation amplitude of the magnetic head $17_1$ satisfies the stipulated level.

Among the methods 1 through 3, method 1 requires the least calculation time and the least memory usage. Since method 1 involves a simple addition of the position error (difference), there is a possibility that low-frequency oscillation components may also be picked up.

Method 2 for measuring high-frequency oscillation is explained next with reference to the flowchart in FIG. 9. In method 2, after the seek operation of the magnetic head $17_1$ has ended, a predetermined number (for instance, 32) is added to an absolute value obtained from addition, subtraction, and multiplication of the position signal levels of three adjoining sample points, based on expression (2) of FIG. 7.

In FIG. 9, in step SD1, the high-frequency oscillation monitoring section 60 sets the initial value of n to zero. In step SD2, the high-frequency oscillation monitoring section 60 sets the position signal level P(n) of the position signal, shown in FIG. 5, to the current position signal level.

In step SD3, the high-frequency oscillation monitoring section 60 adds the previous addition value f2(n−1) and the next addition value |P(n)−2P(n−1)+P(n−2)| to calculate the addition value f2(n).

In step SD4, the high-frequency oscillation monitoring section 60 increments n by one. In step SD5, the high-frequency oscillation monitoring section 60 determines whether n has exceeded 31. If n has not exceeded 31 ('No' at step SD5), the high-frequency oscillation monitoring section 60 goes back to step SD2 and repeats the subsequent steps. In this way, the absolute values of addition, subtraction, and multiplication of the three adjoining sampling points (represented by hollow circles in FIG. 5) can be serially added.

If the value of n exceeds 31 ('Yes' at step SD5), that is, if the result of expression (2) in FIG. 7 is obtained, the serial addition process is over. Next, the high-frequency oscillation monitoring section 60 compares the addition value f2(n) obtained by method 2 and the preset threshold value, to determine whether the oscillation amplitude of the magnetic head $17_1$ exceeds the stipulated level. To be more specific, if the addition value f2(n) is greater than the threshold value, the high-frequency oscillation monitoring section 60 recognizes that the oscillation amplitude of the magnetic head $17_1$ is greater than the stipulated level. On the other hand, if the addition value f2(n) is less than the threshold value, the high-frequency oscillation monitoring section 60 recognizes that the oscillation amplitude of the magnetic head $17_1$ satisfies the stipulated level.

Of method 1 and method 2, the latter is a more accurate method for monitoring high-frequency oscillation. This is because, in method 2, the low-frequency oscillation components do not get added easily. However, in method 2, since three operations, namely, addition, subtraction, and multiplication, of the three sample points are carried out, the calculation takes longer.

Method 3 for measuring high-frequency oscillation is explained next with reference to the flowchart in FIG. 10. In method 3, after the seek operation of the magnetic head $17_1$ has ended, a predetermined number (for instance, 32) is added to the absolute values of addition, subtraction, and multiplication of the position signal levels of three adjoining sample points, based on expression (2) of FIG. 7.

In FIG. 10, in step SE1, the high-frequency oscillation monitoring section 60 sets the initial value of n to zero. In step SE2, the high-frequency oscillation monitoring section 60 determines if the line joining five adjoining points, for example, P(n), P(n−1), P(n−2), P(n−3), and P(n−4), of the position signals shown in FIG. 5 forms a mountain (see graph A) or a valley (see graph B). If this line forms a mountain or a valley ('Yes' at step SE2), the high-frequency oscillation monitoring section 60 proceeds to step SE3. If this line does not form a mountain or a valley ('No' at step SE2), the high-frequency oscillation monitoring section 60 proceeds to step SE6.

In step SE3, the high-frequency oscillation monitoring section 60 sets P(n) of the position signal shown in FIG. 5 to the current position signal level.

In step SE4, the high-frequency oscillation monitoring section 60 adds the previous addition value f2(n−1) and the next addition value |P(n)−2P(n−1)+P(n−2)| to calculate the addition value f2(n).

In step SE5, the high-frequency oscillation monitoring section 60 increments n by one. In SE6, the high-frequency oscillation monitoring section 60 determines whether n has exceeded 31. If n has not exceeded 31 ('No' at step SE6), the high-frequency oscillation monitoring section 60 goes back to step SE2 and repeats the subsequent steps. In this way, the absolute values of addition, subtraction, and multiplication of the five adjoining sampling points (represented by hollow circles in FIG. 5) can be serially added.

If the value of n exceeds 31 ('Yes' at step SE6), that is, if the result of expression (2) in FIG. 7 is obtained, the serial addition process is over. Next, the high-frequency oscillation monitoring section 60 compares the addition value f2(n) obtained by method 3 and the preset threshold value, to determine whether the oscillation amplitude of the magnetic head $17_1$ exceeds the stipulated level. To be more specific, if the addition value f2(n) is greater than the threshold value, the high-frequency oscillation monitoring section 60 recognizes that the oscillation amplitude of the magnetic head $17_1$ is greater than the stipulated level. On the other hand, if the addition value f2(n) is less than the threshold value, the high-frequency oscillation monitoring section 60 recognizes that the oscillation amplitude of the magnetic head $17_1$ satisfies the stipulated level.

Of the methods 2 and 3, the latter is a more accurate, as in this method the high-frequency oscillations close to the servo interruption period (sampling period) can be monitored.

FIG. 11B illustrates a waveform of a position signal that includes numerous high-frequency oscillation components. FIG. 11A is a table that illustrates the result when methods 1 through 3 are applied to the waveform. The column 'Method 1' in the table shows the figure '9752' as the addition value f1(n) in method 1. The column 'Method 2' shows the figure '9607' as the addition value f2(n) in method 2. The column 'Method 3' shows the figure '4046' as the addition value f2(n) in method 3. The columns 'Max Method 1', 'Max Method 2', and 'Max Method 3' show the maximum of |P(n)−P(n−1)|, |P(n)−2P(n−1)+P(n−2)| in methods 1 through 3.

FIG. 12B illustrates a waveform of a position signal that does not include many high-frequency oscillation components. FIG. 12A is a table that illustrates the result when methods 1 through 3 are applied to the waveform. The column 'Method 1' in the table shows the figure '1429' as the addition value f1(n) in method 1. The column 'Method 2' shows the figure '1392' as the addition value f2(n) in method 2. The column 'Method 3' shows the figure '1638' as the addition value f2(n) in method 3. The columns 'Max Method 1', 'Max Method 2', and 'Max Method 3' show the maximum of |P(n)−P(n−1)|, |P(n)−2P(n−1)+P(n−2)| in methods 1 through 3.

Referring again to FIG. 6A, the digital servo controller 31 reads a disturbance signal in step SA6. In step SA7, the digital servo controller 31 adds, as a reading of a digital-to-analog converter, the control current value and a disturbance value obtained from the disturbance signal. In step SA8, the digital servo controller 31 outputs the reading of the digital-to-analog converter. In this way, the drive current required for correcting the position of the magnetic head $17_1$ is supplied to the voice coil motor 32.

Task 2 that is carried out in the servo interruption period T2 is explained next with reference to the flowchart shown in FIG. 6B. In step SB1, the digital servo controller 31 determines whether the servo pattern of the magnetic disk $50_1$ has been detected. If the servo pattern has not been detected ('No' at step SB1), the digital servo controller 31 repeats the same determination process. If the servo pattern of the magnetic disk $50_1$ is detected, step SB2 is executed.

In step SB2, the digital servo controller 31 reads the servo pattern and generates a position signal (see FIG. 5) from the servo pattern. In step SB3, the digital servo controller 31 reads the disturbance signal. In step SB4, the digital servo controller 31 adds the control current value stored in step SA5 and the disturbance value obtained from the disturbance signal, to calculate the reading of the digital-to-analog converter. In step SB5, the digital servo controller 31 outputs the reading of the digital-to-analog converter. In this way, the drive current required for correcting the position of the magnetic head $17_1$ is supplied to the voice coil motor 32. Subsequently, the servo processes explained in FIG. 6A and FIG. 6B are alternately executed.

According to the first embodiment, since the high-frequency oscillation components can be monitored during the servo interruption period, the high-frequency oscillation components arising due to a jiggle of the magnetic head $17_1$ can be monitored. The adjoining sample points that are monitored may be two, three, or five.

Figure 13:
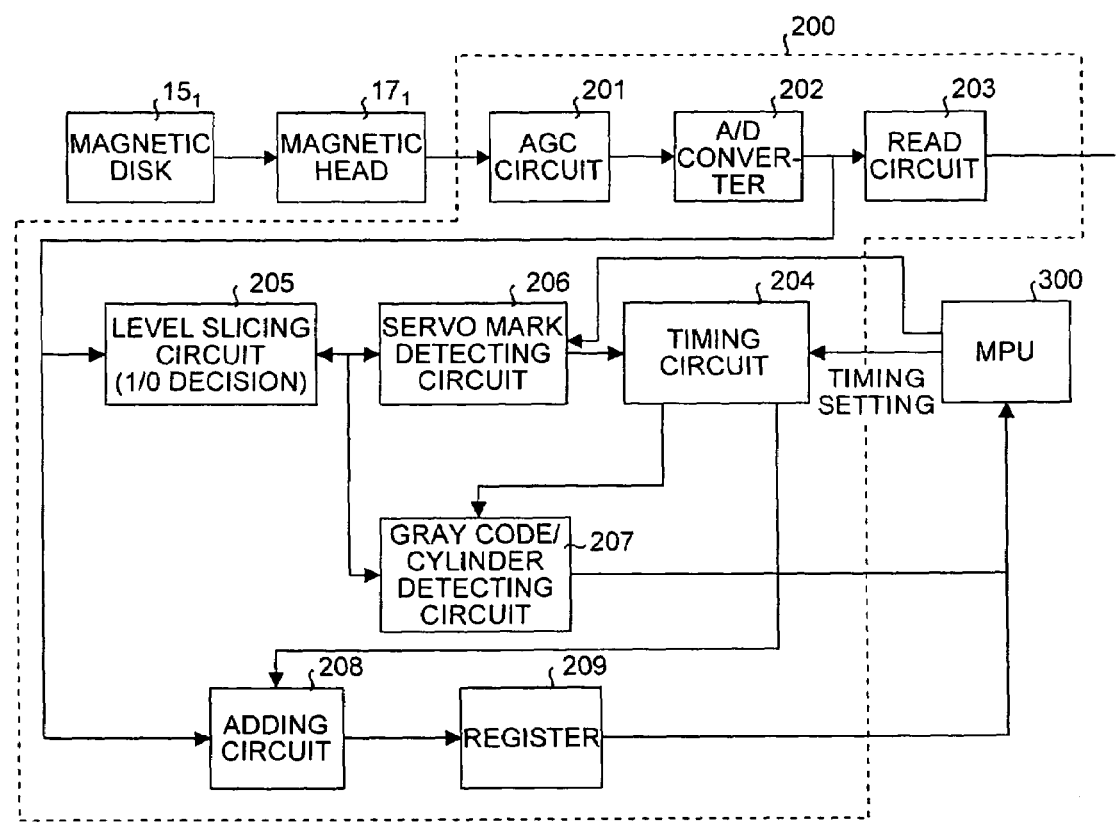
FIG. 13 is a block diagram of a control circuit of a magnetic disk apparatus according to a second embodiment of the present invention.

FIG. 13 is a block diagram of a control circuit of the magnetic disk apparatus according to a second embodiment of the present invention. The parts in FIG. 13 that are identical to those in FIG. 19 are assigned identical reference numerals. This magnetic disk apparatus includes a read channel 200. The read channel 200 includes an auto gain control (AGC) circuit 201, an analog/digital (A/D) converter 202, a read circuit 203, a timing circuit 204, a level slicing circuit 205, a servo mark detecting circuit 206, a gray code/cylinder detecting circuit 207, an adding circuit 208, and a register 209.

Figure 21:
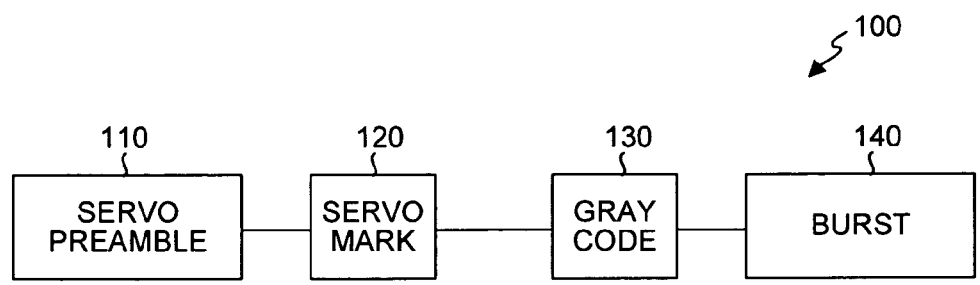
FIG. 21 illustrates the structure of a servo pattern 100.

When the magnetic head $17_1$ reads a burst 140 (see FIG. 21), the auto gain control circuit 201 performs an automatic gain adjustment. Next, the analog/digital converter 202 converts analog signals output from the auto gain control circuit 201, to digital signals. The read circuit 203 processes the read signals. The timing circuit 204 generates the timing for servo control based on a setting of a microprocessor unit 300. The level slicing circuit 205 slices by a predetermined threshold value, the output signals (servo mark signals, gray code signals, etc) output from the analog/digital converter 202. When the servo mark detecting circuit 206 detects the servo mark 120 (see FIG. 21) based on the servo mark signal from the level slice circuit 205, the gray code/cylinder detecting circuit 207 detects, according to the timing from the timing circuit 204, the whole number part of the cylinder from the gray code signal that is output from the level slicing circuit 205, and outputs the whole number part of the cylinder to the microprocessor unit 300.

Figure 22:
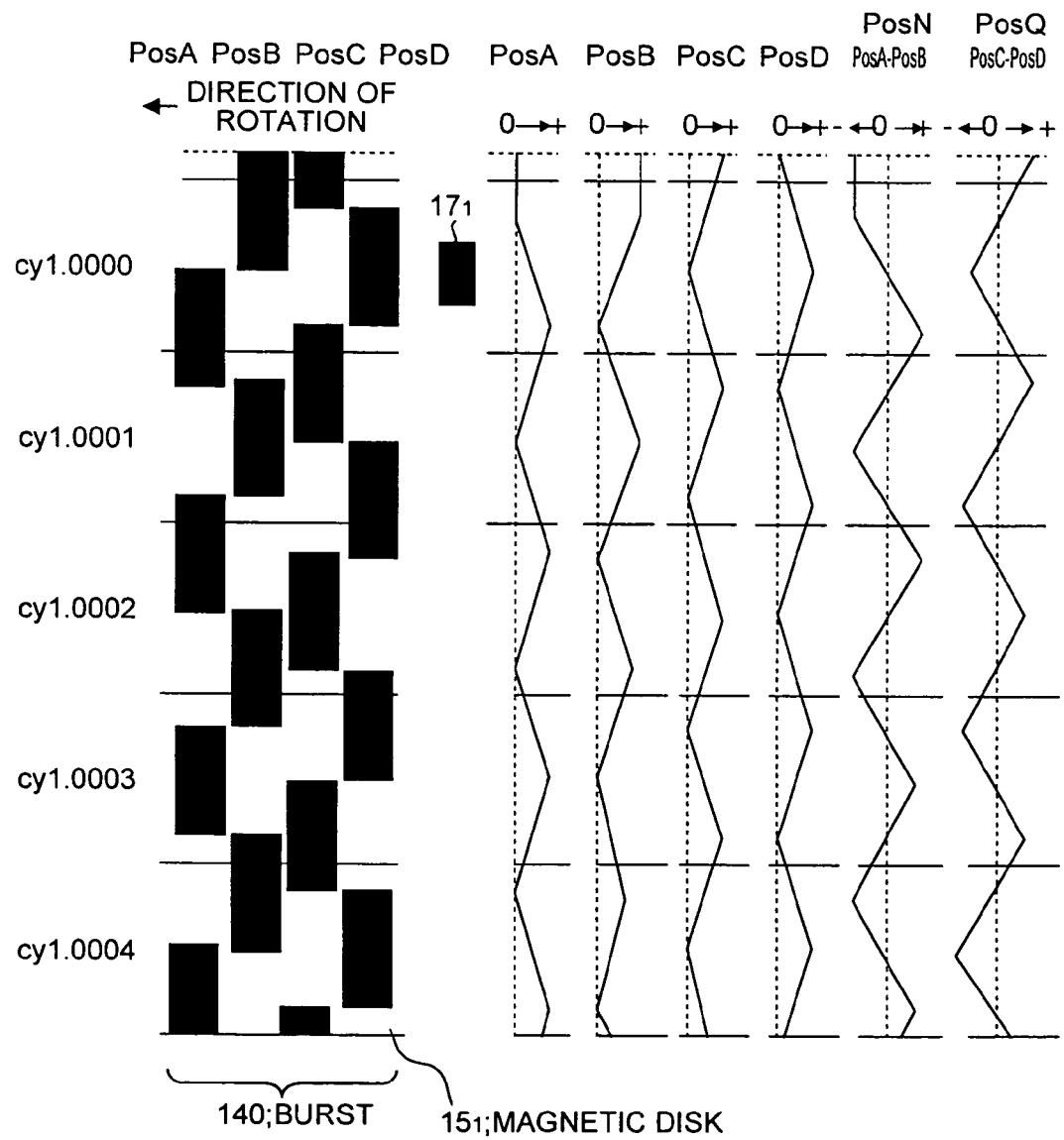
FIG. 22 illustrates a burst 140 and all types of signals shown in FIG. 21.
Figure 23:
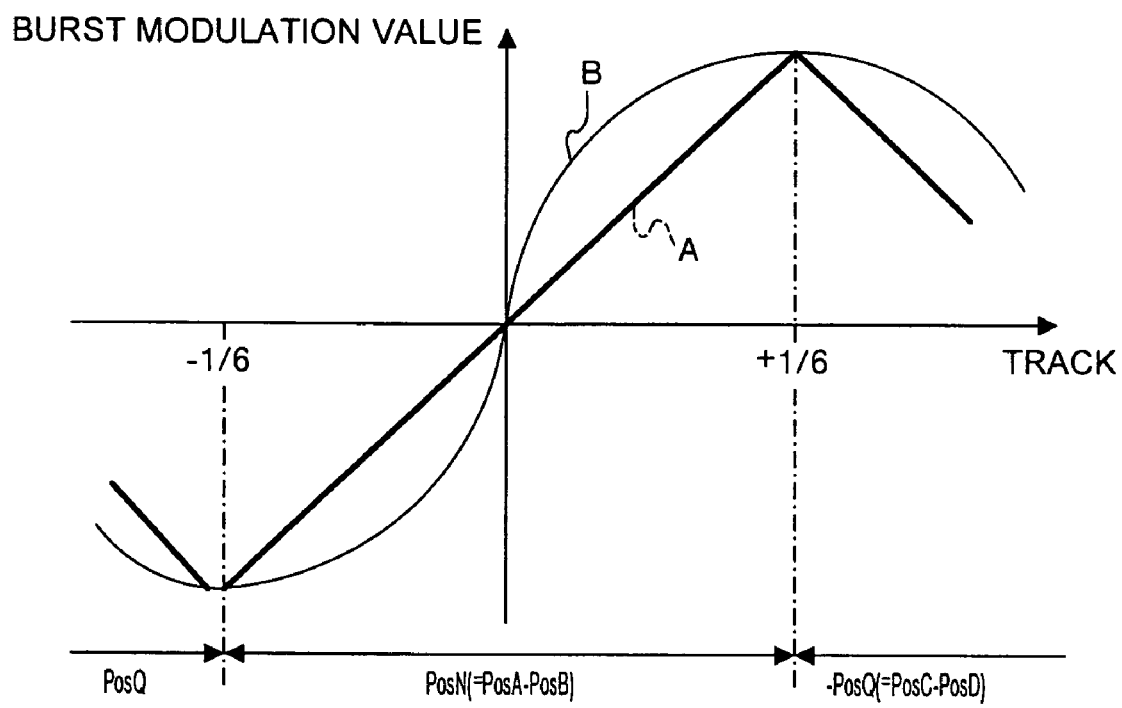
FIG. 23 illustrates a linear correction process.

The adding circuit 208 adds the information relating to the burst signal output from the analog/digital converter 202. The register 209 stores the information relating to the signals PosA, PosB, PosC, and PosD (see FIG. 22). The microprocessor unit 300 calculates, from the information stored in the register 209, the pre-corrected signals PosN and PosQ ((see FIG. 14) (burst modulation value)).

Figure 15:
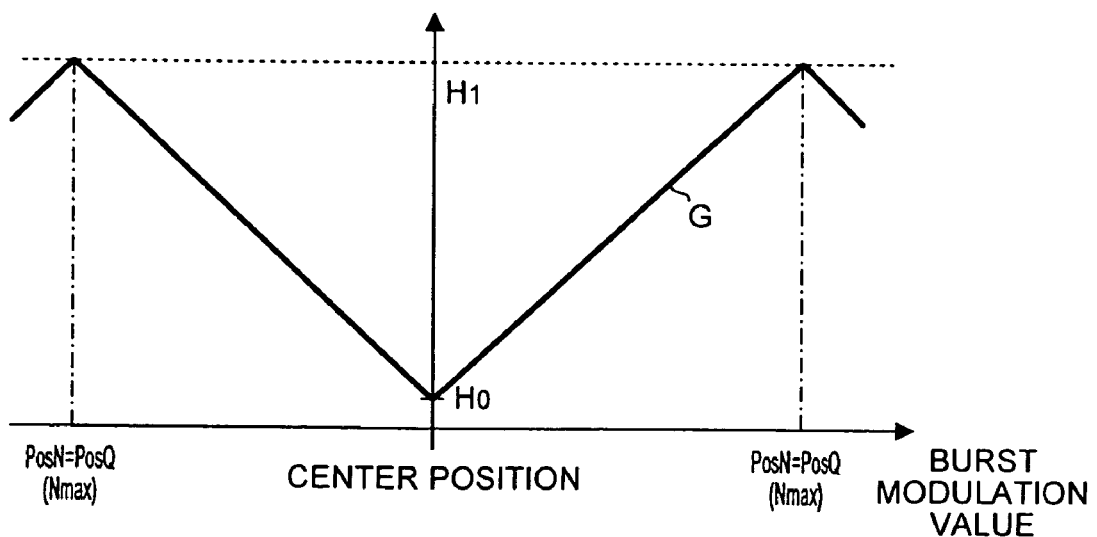
FIG. 15 illustrates the relation between the burst modulation value and a head sensitivity characteristic value in the second embodiment.

The microprocessor unit 300 then executes a correction process by multiplying the head sensitivity characteristic value, which proportionally changes from a minimum value of $H_0$ to a maximum value of $H_1$, as illustrated in FIG. 15, with the burst modulation value.

Figure 14:
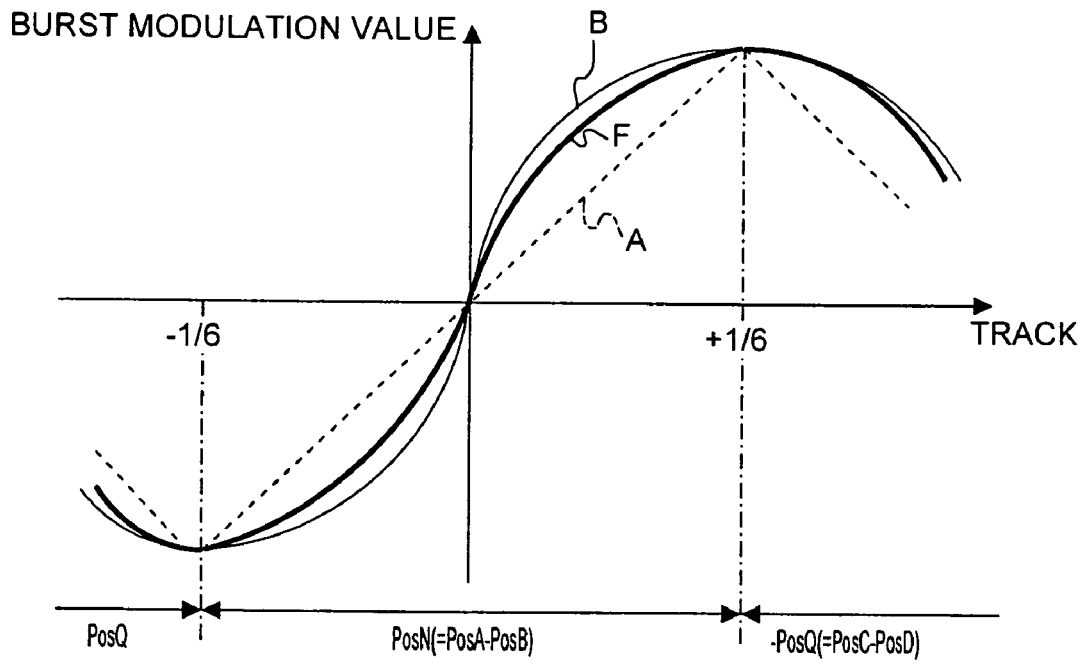
FIG. 14 illustrates the relation between a track and a burst modulation value in the second embodiment of the present invention.

A position deviation signal F is produced in this manner. FIG. 14 illustrates the relation between a track and a burst modulation value. The position deviation signal F is closer to the ideal position deviation signal B than to the conventional position deviation signal A, as can be clearly seen from the figure. When the magnetic head $17_1$ is positioned on the target track, a current instruction value corresponding to the position deviation signal F controls the magnetic head $17_1$ in such a way that the magnetic head $17_1$ is positioned at the center of the target track.

Figure 17:
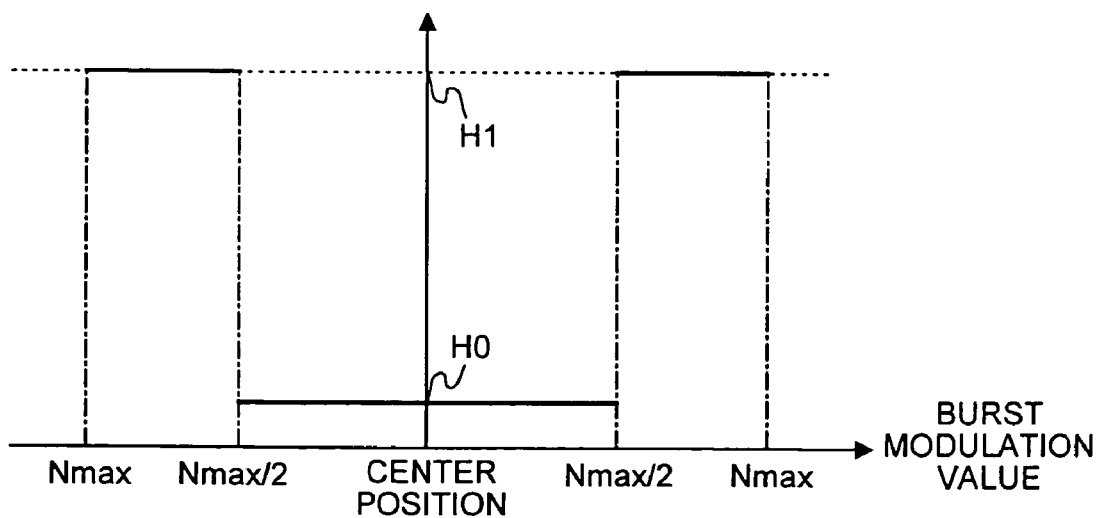
FIG. 17 illustrates the relation between the burst modulation value and a head sensitivity characteristic value in the second embodiment.
Figure 18:
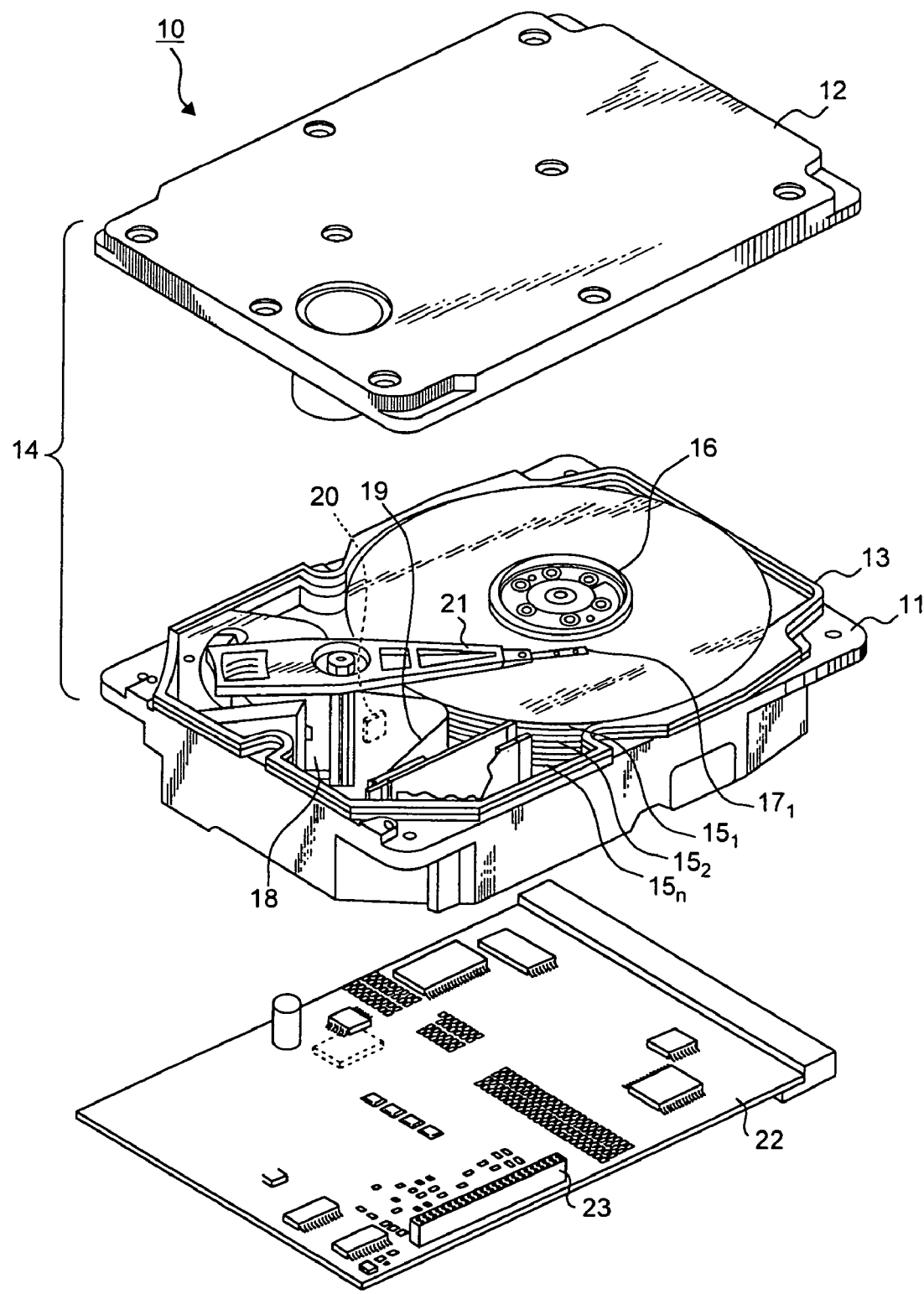
FIG. 18 is an perspective view that illustrates an external structure of a conventional magnetic disk apparatus 10.

The distance up to the intermediate value $N_{max}/2$ (see FIG. 17) that falls between the center of the burst demodulation value and $N_{max}$ can be considered as the minimum value $H_0$ (head sensitivity characteristic value) and the distance from the intermediate value $N_{max}/2$ up to $N_{max}$ can be considered as the maximum value $H_1$ (head sensitivity characteristic value). A two-value correction process may be executed in the microprocessor unit 300 by multiplying these two head sensitivity characteristic values $H_0$ and $H_1$ with the burst modulation value. A three-value or greater correction process may also be carried out.

Figure 16:
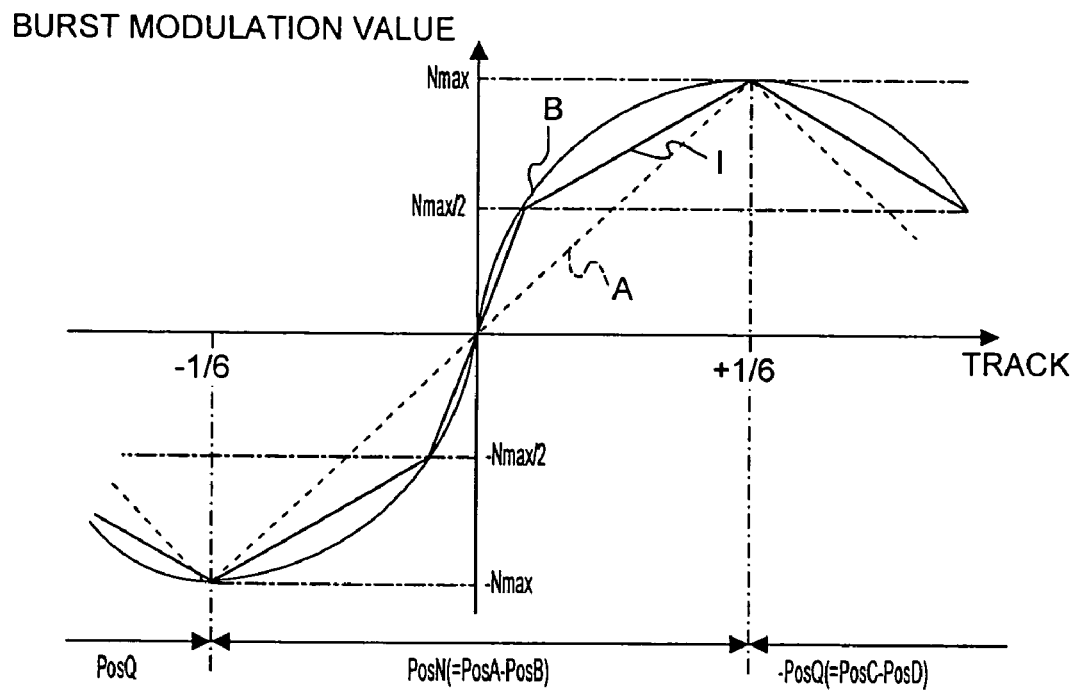
FIG. 16 illustrates the relation between a track and a burst modulation value in the second embodiment.

FIG. 16 illustrates a position deviation signal I generated as explained above. The position deviation signal I is an intermediate continuous signal and falls between conventional position deviation signal A and the ideal position deviation signal B, as can be clearly seen from the drawing. When the magnetic head $17_1$ is positioned on the target track, the current instruction value corresponding to the position deviation signal I controls the magnetic head $17_1$ in such a way that the magnetic head $17_1$ is positioned at the center of the target track.

The correction process of the burst modulation value may be executed in the microprocessor unit 300 by employing different head sensitivity values for odd-numbered cylinders and even-numbered cylinders.

The correction process may be carried out by multiplying an amplitude ratio correction value corresponding to an amplitude ratio of the signal corresponding to a servo preamble 110 (see FIG. 21) with the head sensitivity value, and further multiplying the product with the burst demodulation value.

Figure 24:
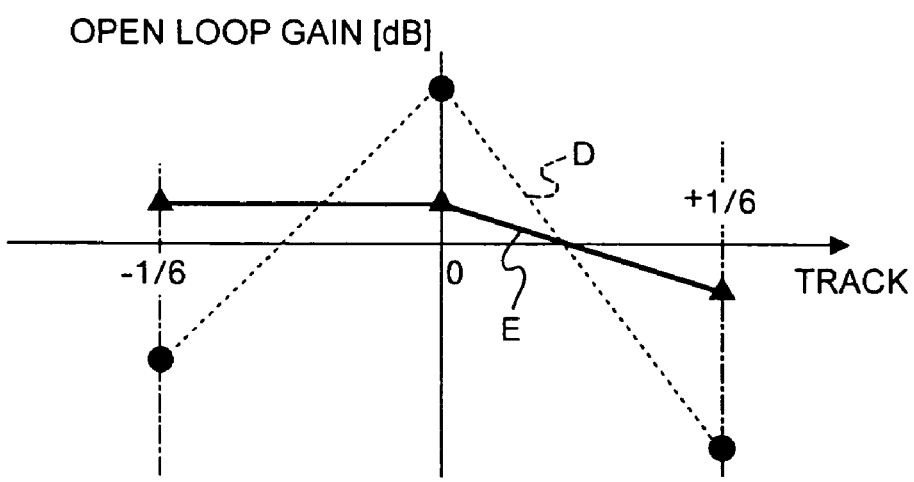
FIG. 24 illustrates an open loop gain characteristic obtained when a zero-cross frequency disturbance of very small amplitude is introduced in the design.

The correction process may be carried out by multiplying a ratio of an open loop gain obtained by adding a minute amplitude disturbance to a zero-cross frequency, with the open loop gain obtained by adding a large amplitude disturbance (amplitude+3 tracks) to the head sensitivity characteristic value, and further multiplying the product with the burst demodulation value. In this instance, the variation in the open loop gains can be corrected, as shown by a characteristic line E in FIG. 24.

According to one aspect of the present invention, high-frequency oscillation components included in the oscillation frequency of the magnetic head can be monitored during the servo interruption period.

According to another aspect of the present invention, the accuracy of the position of the magnetic head is increased even if the head sensitivity characteristic is non-linear.

INDUSTRIAL APPLICABILITY

The magnetic disk apparatus and the high-frequency oscillation monitoring method are preferably used when high-frequency oscillation components are included in the oscillation frequency of the magnetic head.

The invention claimed is:

1. A magnetic disk apparatus including a magnetic disk having servo patterns on which position signals for controlling a position of a magnetic head on the magnetic disk are written, the magnetic head having a head sensitivity characteristic value, comprising:
    a correction calculation unit that calculates a correction value to correct the position signals read from the servo patterns, using the head sensitivity characteristic value; and
    a servo control unit that carries out a servo control of the magnetic head based on the correction value,
    wherein the magnetic disk has a plurality of first servo sectors and a plurality of second servo sectors arranged alternately, wherein the servo patterns are stored on the first servo sectors and the second servo sectors, wherein when a servo interruption period corresponding to adjacent first servo sectors is a first servo interruption period, a servo interruption period corresponding to an adjacent first servo sector and a second servo sector is a second servo interruption period, and wherein the second servo interruption period is equal to or less than half of the first servo interruption and the correction unit corrects the position signals using a ratio of an open loop gain obtained by adding a predetermined amplitude disturbance to a zero-cross frequency, and an open loop gain obtained by adding a large amplitude disturbance to the head sensitivity characteristic value.

2. The magnetic disk apparatus according to claim 1, wherein the head sensitivity characteristic value is set so as to change proportionally.

3. The magnetic disk apparatus according to claim 1, wherein the head sensitivity characteristic value is set so as to change multi-value.

4. The magnetic disk apparatus according to claim 1, wherein the correction unit corrects the position signals using an amplitude ratio of predetermined signals included in the position signals, and the head sensitivity characteristic value.

5. The magnetic disk apparatus according to claim 1, wherein the correction unit corrects the position signals, for each cylinder of the magnetic disk, using a different head sensitivity characteristic value set to each cylinder.

* * * * *